(12) United States Patent
Brown et al.

(10) Patent No.: US 10,139,027 B1
(45) Date of Patent: Nov. 27, 2018

(54) FLANGE ASSEMBLY WITH FRANGIBLE GATE FOR MOUNTING AIR CANNONS TO BULK MATERIAL PROCESSING EQUIPMENT

(71) Applicant: Martin Engineering Company, Neponset, IL (US)

(72) Inventors: Doug Brown, Dahinda, IL (US); Robert Nogaj, Dunlap, IL (US)

(73) Assignee: MARTIN ENGINEERING COMPANY, Neponset, IL (US)

( * ) Notice: Subject to any disclaimer, the term of this patent is extended or adjusted under 35 U.S.C. 154(b) by 26 days.

(21) Appl. No.: 15/642,815

(22) Filed: Jul. 6, 2017

(51) Int. Cl.
| F16L 41/04 | (2006.01) |
| F16K 3/314 | (2006.01) |
| B65G 69/06 | (2006.01) |
| F16K 3/02 | (2006.01) |
| F16L 23/02 | (2006.01) |
| F16K 27/10 | (2006.01) |
| F16L 41/12 | (2006.01) |
| B65D 88/70 | (2006.01) |

(52) U.S. Cl.
CPC .............. *F16L 41/04* (2013.01); *B65G 69/06* (2013.01); *F16K 3/0281* (2013.01); *F16K 3/314* (2013.01); *F16K 27/105* (2013.01); *F16L 23/02* (2013.01); *F16L 41/12* (2013.01); *B65D 88/703* (2013.01)

(58) Field of Classification Search
CPC . F16L 41/04; F16L 41/12; F16L 23/02; F16K 3/0281; F16K 3/314; F16K 13/04; F16K 27/105
See application file for complete search history.

(56) References Cited

U.S. PATENT DOCUMENTS

| 3,327,894 | A | * | 6/1967 | Ferris ...................... F02K 9/60 |
| | | | | 137/68.23 |
| 4,023,584 | A | | 5/1977 | Rogers et al. |
| 5,419,354 | A | * | 5/1995 | Krynicki ................. F16K 17/40 |
| | | | | 137/1 |
| 6,938,636 | B1 | * | 9/2005 | Nimberger .............. F16L 29/04 |
| | | | | 137/15.09 |
| 7,837,062 | B2 | | 11/2010 | Pronschinske et al. |
| 9,604,262 | B2 | | 3/2017 | Nash et al. |
| 9,909,700 | B2 | * | 3/2018 | O'Brien ................... F16K 35/06 |
| 2003/0132241 | A1 | * | 7/2003 | Treat .................... B65D 88/703 |
| | | | | 222/4 |
| 2003/0146245 | A1 | | 8/2003 | Weiler et al. |

(Continued)

OTHER PUBLICATIONS

International Search Report and Written Opinion for PCT/US2018/040733 dated Sep. 13, 2018.

*Primary Examiner* — Kevin Lee

(74) *Attorney, Agent, or Firm* — Thompson Coburn LLP

(57) ABSTRACT

A flange assembly comprises an annular mounting ring and a gate. The annular mounting ring is configured to be welded to the equipment and to connect an air cannon thereto. The mounting ring comprises threaded bolt holes and a slot and encircles a fluid passageway. The gate comprises a blocking portion that is frangibly connected to a flange portion. The gate is at least partially insertable through the slot such that the blocking portion is able to at least partially prevent fluid flow through the fluid passageway. The flange portion is configured to be securely attached to the annular mounting ring after the blocking portion of the gate has been frangibly disconnected from the flange portion.

10 Claims, 6 Drawing Sheets

(56) References Cited

U.S. PATENT DOCUMENTS

2008/0265066 A1    10/2008  Miller et al.
2009/0001097 A1     1/2009  Pronschinske et al.
2016/0069493 A1*    3/2016  Leseth et al. ....... F16K 37/0075
                                                        251/150

* cited by examiner

FLANGE ASSEMBLY WITH FRANGIBLE GATE FOR MOUNTING AIR CANNONS TO BULK MATERIAL PROCESSING EQUIPMENT

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to bulk material handling/processing equipment. More particularly, the present invention pertains to a flange assembly for mounting air cannons to bulk material processing equipment.

General Background

Air cannons are used in the bulk material handling and processing industry for dislodging accumulated bulk material deposits from surfaces of bulk material handling/processing equipment, such as kilns, hoppers, and transfer chutes. An example of an air cannon is described in U.S. Pat. No. 7,837,062, issued Nov. 23, 2010, which is hereby incorporated herein by reference in its entirety.

An air cannon comprises of a pressure vessel, a discharge valve, and a discharge passageway. The pressure vessel is periodically filled with pressurized gas, such as air, from a pressurized gas source. When the discharge valve is actuated, typically via gas pressure, the stored compressed gas in the pressure vessel escapes from the pressure vessel and is discharged into the discharge passageway. This process occurs very abruptly and converts the stored potential energy of the compressed gas into kinetic energy. The gas escapes from the gas passageway through an outlet, typically at supersonic speeds. The resulting blast of gas transfers much of its energy to the accumulated bulk material and thereby dislodges the accumulated bulk material from surfaces. Although the compressed gas is typically air, other gases such as nitrogen or carbon-dioxide are also sometimes used. Regardless of the composition of the gas, such a device is commonly and herein referred to as an air cannon.

Typically such air cannons are mounted to an exterior wall of a hopper, chute, kiln, or other piece of bulk material processing/handling equipment via a pipe/tube extending downstream of the discharge valve of the air cannon. The pipe may be welded or bolted to the piece of bulk material processing/handling equipment around a hole that passes through the wall of the equipment. A bolt flange may also be provided to allow the pipe to be removable from the material processing/handling equipment.

It is not uncommon to add air cannons to operational bulk material processing/handling equipment after it becomes evident where accumulation of bulk material is occurring. To avoid disrupting the processing/handling of bulk material, it is desirable to have the ability to install an air cannon while the bulk material processing/handling equipment is operating. This often requires drilling, boring, or cutting a hole or opening through the wall of the bulk material processing/handling equipment, which briefly exposes a passageway for bulk material and/or gases to pass through the wall. Such exposure can disrupt the processing/handling of bulk material and/or hamper the installation of the air cannon. Moreover, in some cases hot gas and/or material can pass out of the exposed hole/opening during that process, thereby making the installation of the air cannon dangerous.

SUMMARY OF THE INVENTION

The present invention is directed to a flange assembly for, and method of, mounting air cannons to bulk material processing equipment while such equipment is operating. The flange assembly comprises a gate that temporarily blocks the flow of bulk material and gases through the wall of the handling/processing equipment while the air cannon is being installed to the equipment.

In one aspect of the invention, a flange assembly for mounting air cannons to bulk material processing equipment comprises an annular mounting ring and a gate. The mounting ring consists of at least one component and is configured and adapted to be welded to bulk material processing equipment and connected to an air cannon in a manner connecting the air cannon to the bulk material processing equipment. The mounting ring comprises a plurality of circumferentially spaced threaded bolt holes and a slot. The mounting ring encircles a fluid passageway configured to allow fluid to pass through the mounting ring. The gate comprises a temporary blocking portion that is frangibly connected to a flange portion. The gate is at least partially insertable through the slot of the mounting ring in a manner such that the blocking portion is able to at least partially prevent fluid from flowing through the fluid passageway of the mounting ring. The flange portion of the gate is configured to be securely attached to the annular mounting ring via at least one bolt threaded at least partially into one of the threaded bolt holes of the mounting ring after the blocking portion of the gate has been frangibly disconnected from the flange portion. The flange assembly is configured such that fluid is able to pass through the fluid passageway of the mounting ring after the blocking portion of the gate has been frangibly disconnected from the flange portion and the flange portion has been secured to the annular mounting ring.

Another aspect of the invention pertains to a method of attaching an air cannon to bulk material processing equipment of the type having a metal outer wall adjacent to a refractory interior wall. The method comprises forming a hole through the metal outer wall of the equipment. Thereafter, a mounting ring is welded to the outer wall. The mounting ring consists of at least one component and comprises a plurality of circumferentially spaced threaded bolt holes and a slot. The mounting ring encircles a fluid passageway configured to allow fluid to pass through the mounting ring. The welding occurs in a manner such that the fluid passageway of the mounting ring is aligned with the hole cut through the outer wall of the equipment. The method then includes cutting a hole through the inner wall of the equipment by passing a drill through the fluid passageway of the mounting ring and through the hole in the outer wall of the equipment. The gate is thereafter inserted at least partially into the slot of the mounting ring. The gate comprises a temporary blocking portion that is frangibly connected to a flange portion. The blocking portion of the gate at least partially prevents fluid from flowing through the fluid passageway of the mounting ring after inserting the gate at least partially into the slot of the mounting ring. Afterwards, a pipe is bolted to the mounting ring via at least one of the threaded bolt holes of the mounting ring. Thereafter, the gate is removed from the slot of the mounting ring and then the frangible connection between the blocking portion of the gate and the flange portion of the gate is broken to thereby separate the blocking portion from the flange portion. The separated flange portion of the gate is then at least partially inserted into the slot of the mounting ring. Finally, the separated flange portion of the gate gets secured to the mounting ring by threading a bolt into at least one of the threaded bolt holes of the mounting ring.

Further features and advantages of the present invention, as well as the operation of the invention, are described in detail below with reference to the accompanying drawings.

Figure 1:
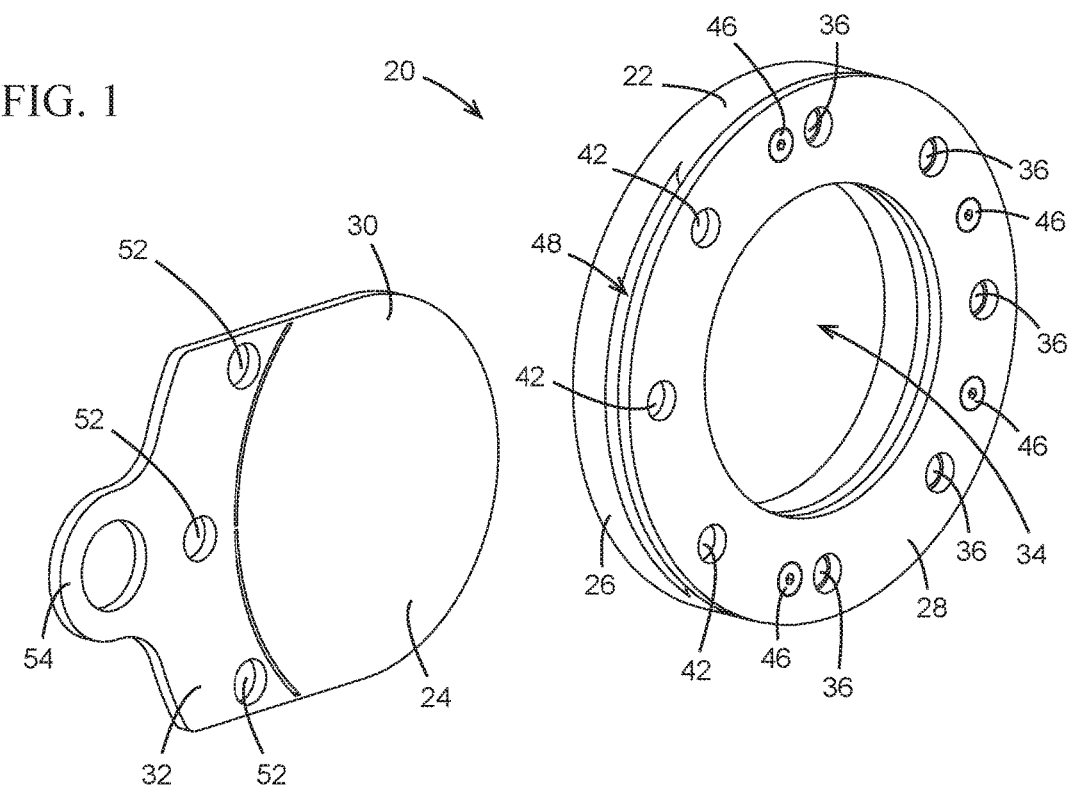
FIG. 1 depicts a flange assembly in accordance with the invention.
Figure 2:
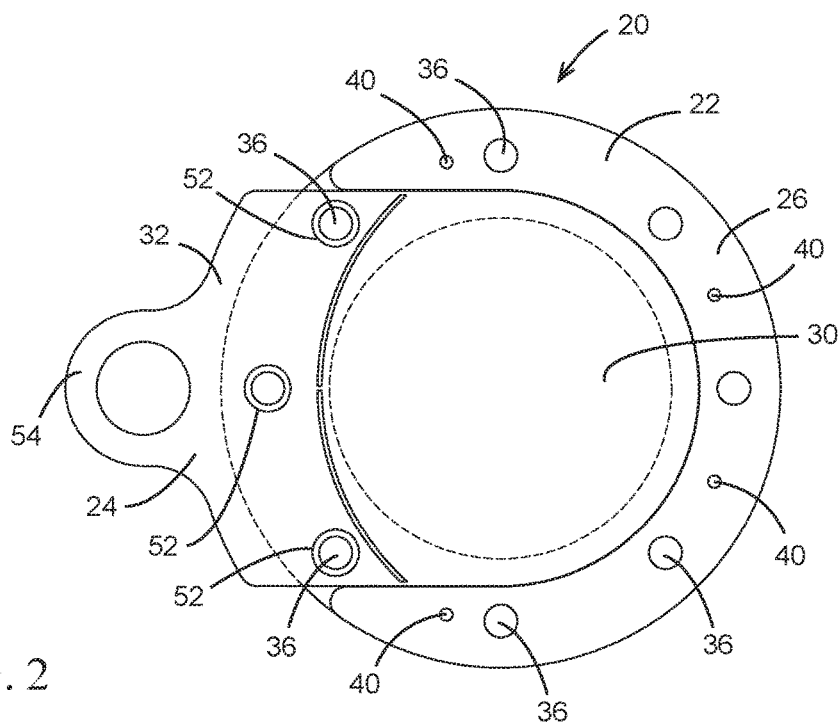
FIG. 2 depicts a hidden-line view showing the gate of the flange assembly positioned in the recess of the primary portion of the mounting ring.
Figure 3:
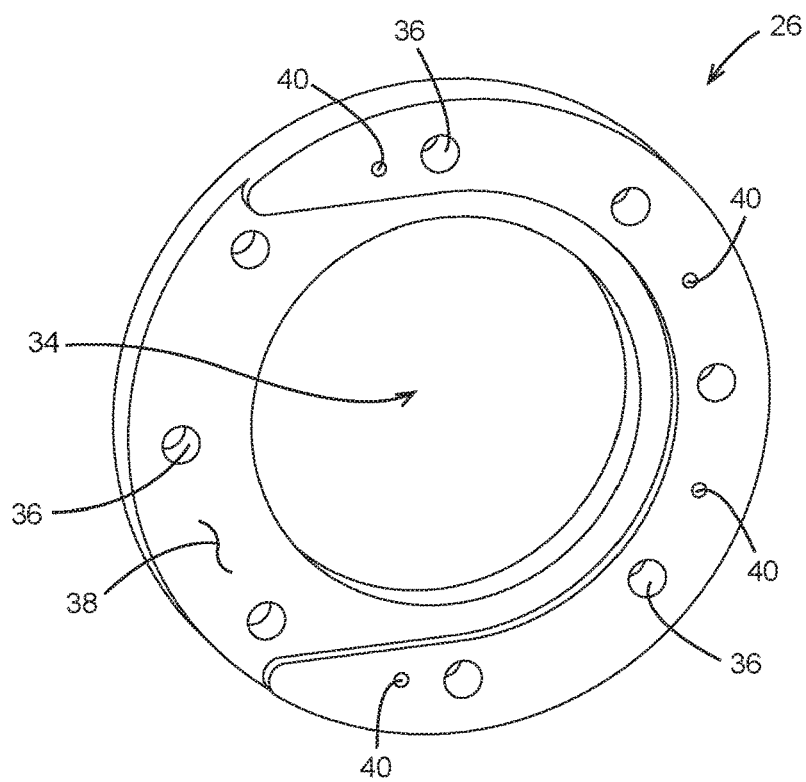
FIG. 3 depicts a perspective view of the primary portion of the mounting ring of the assembly shown in FIGS. 1 and 2.
Figure 4:
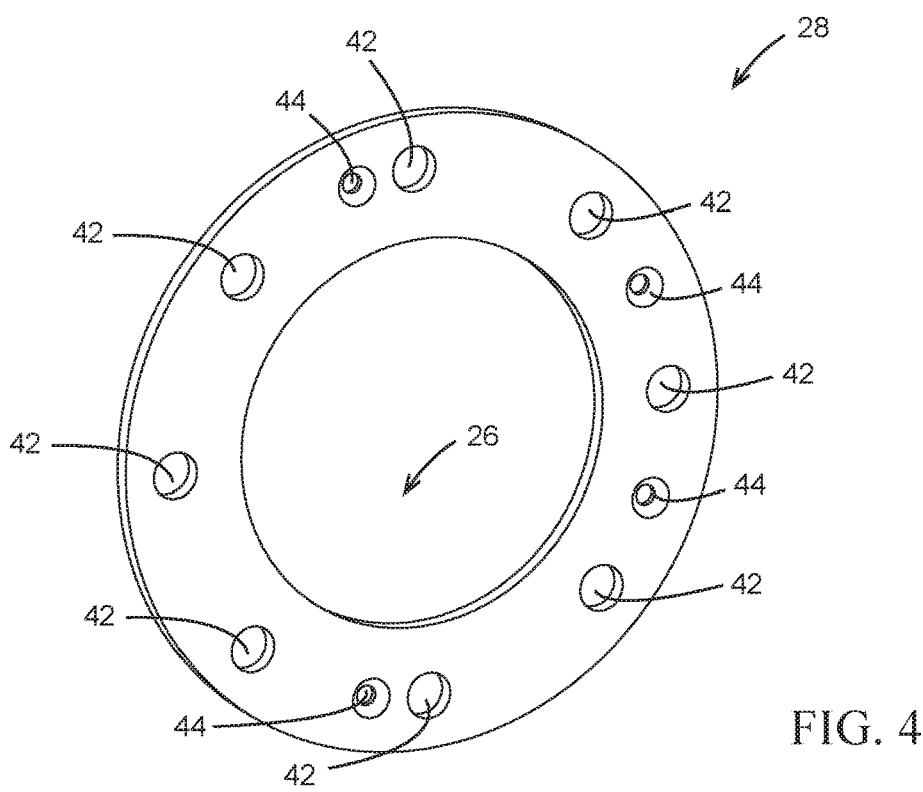
FIG. 4 depicts a perspective view of the secondary portion of the mounting ring of the assembly shown in FIGS. 1 and 2.
Figure 5:
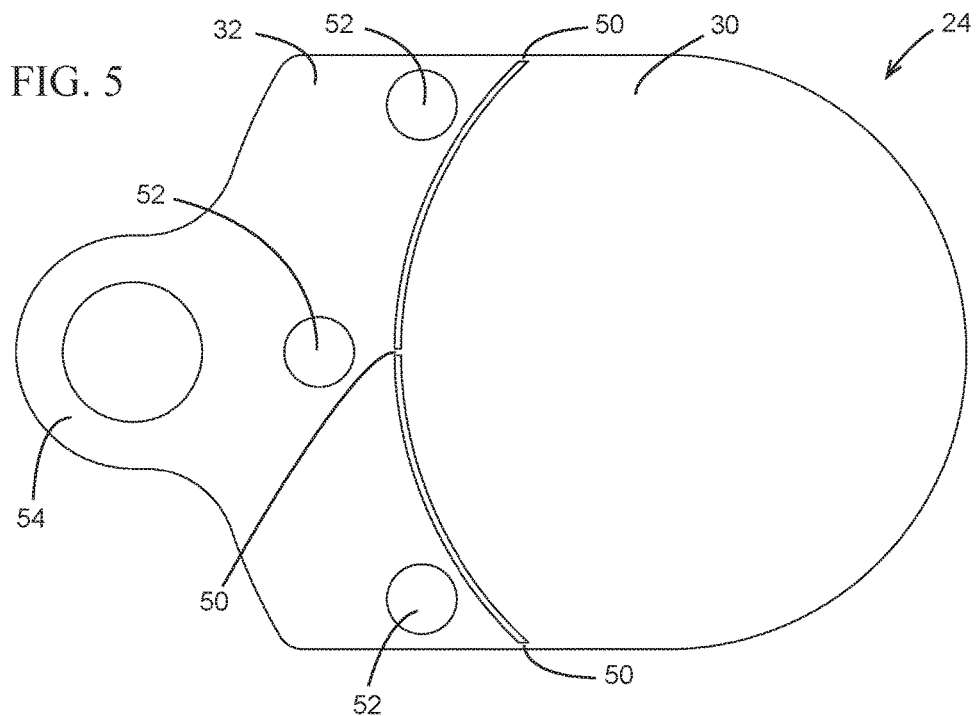
FIG. 5 depicts a front view of the gate of the flange assembly shown in FIGS. 1 and 2.
Figure 6:
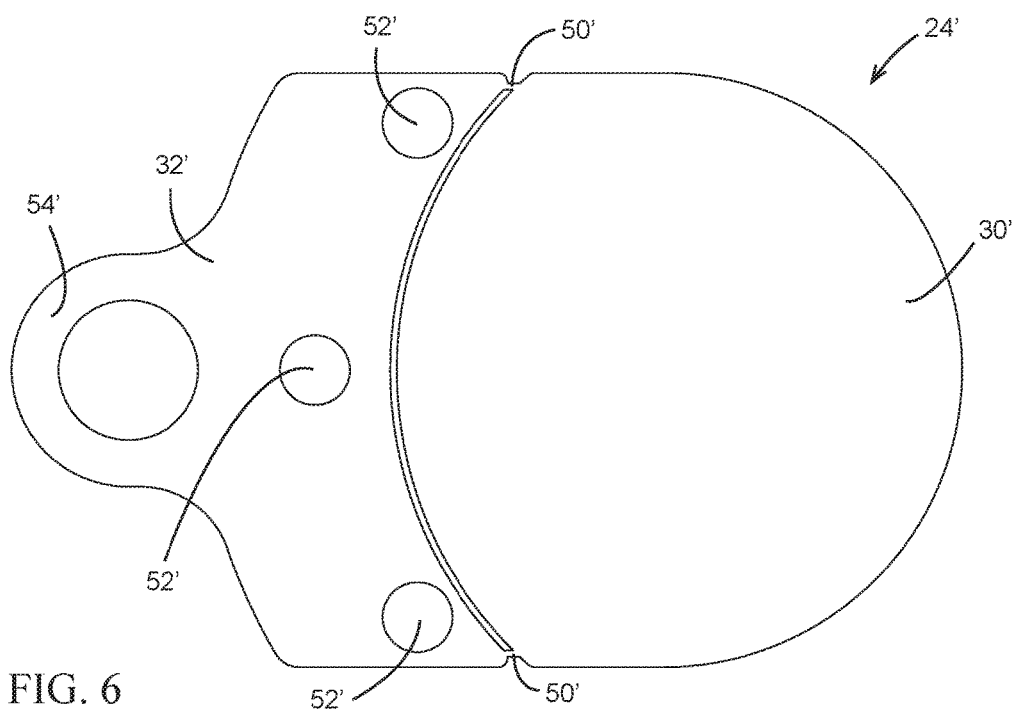
FIG. 6 depicts a front view of an alternative gate that could be used in place of the gate shown in the other figures.
Figure 7:
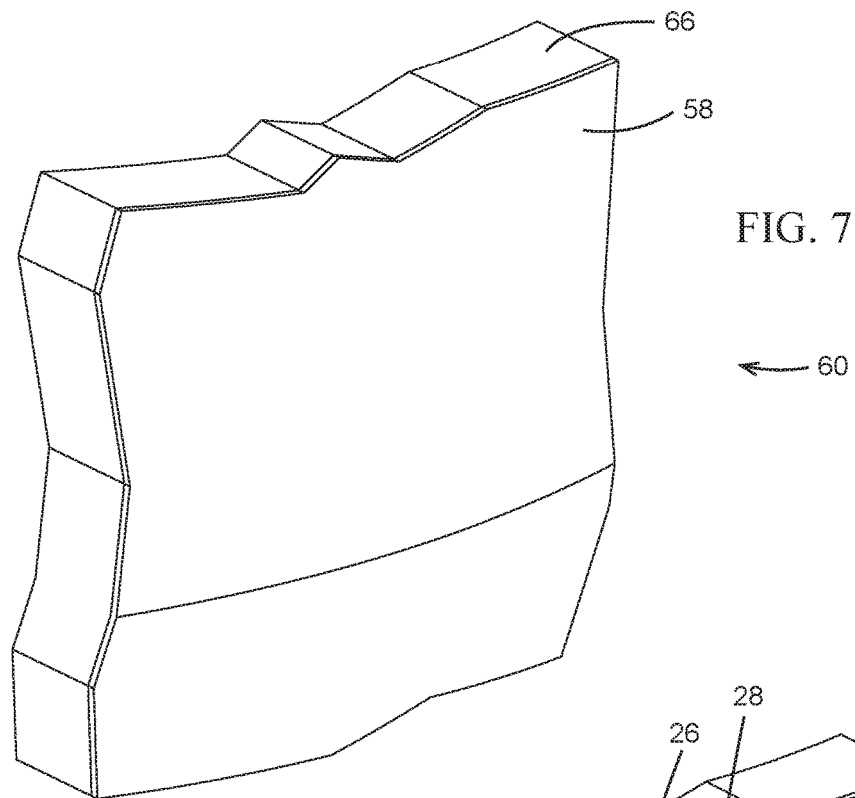
FIG. 7 represents a section of bulk material processing/handling equipment having a metal outer wall adjacent a refractory interior wall.

Reference numerals in the written specification and in the drawing figures indicate corresponding items.

DETAILED DESCRIPTION

A partially exploded-view of a preferred embodiment of a flange assembly (20) in accordance with the invention is shown in FIG. 1. The flange comprises a mounting ring (22) and a gate (24). The mounting ring (22) comprises a primary portion (26) and a secondary portion (28). The gate (24) comprises a blocking portion (30) frangibly connected to a flange portion (32).

The primary portion (26) of the mounting ring (22) is annular and encircles a fluid passageway (34). The primary portion (26) of the mounting ring (22) comprises a plurality of threaded bolt holes (36) circumferentially spaced about and parallel to the fluid passageway (34). The primary portion (26) of the mounting ring (22) further comprises a recess (38) configured to receive the blocking portion (30) of the gate (24). The recess (38) preferably extends around the bounds of the fluid passageway (34). Still further, the primary portion (26) of the mounting ring (22) comprises at least two threaded screw holes (40) formed into the side of the primary portion into which the recess (38) is formed. The secondary portion (28) of the mounting ring (22) is preferably a flat annular ring comprising a plurality of non-threaded bolt holes (42) and at least two non-threaded countersink screw holes (44). The primary portion (26) and the secondary portion (28) of the mounting ring (22) are secured to each other via screws (46) that pass through the countersink screw holes (44) of the secondary portion and into the threaded screw holes (40) of the primary portion. When so secured to each other, the recess (38) of the primary portion (26) of the mounting ring (22) forms a slot (48) between the primary portion and the secondary portion (28) of the mounting ring for receiving part of the gate (24).

The gate (24) is preferably laser cut from a sheet of metal such that the blocking portion (30) of the gate is initially attached to the flange portion (32) of the gate by fracturable bridges (50). The flange portion (32) of the gate (24) is generally arcuate and comprises at least one non-threaded bolt hole (52) and a handle (54).

The flange assembly (20) is preferably shipped with the mounting ring (22) fully assembled. The gate (24) is shipped with the mounting ring (22) and may or may not be inserted in the slot (48) of the mounting ring. An example of using the flange assembly (20) is shown in FIGS. 7-12 and begins with cutting a hole/opening (56) through at least an outer wall (58) of a section of bulk material processing/handling equipment (60). The primary portion (26) of the mounting ring (22) is then welded to the outer wall (58) of the equipment (60) with the fluid passageway (34) of the mounting ring aligned with the hole/opening (56).

Figure 8:
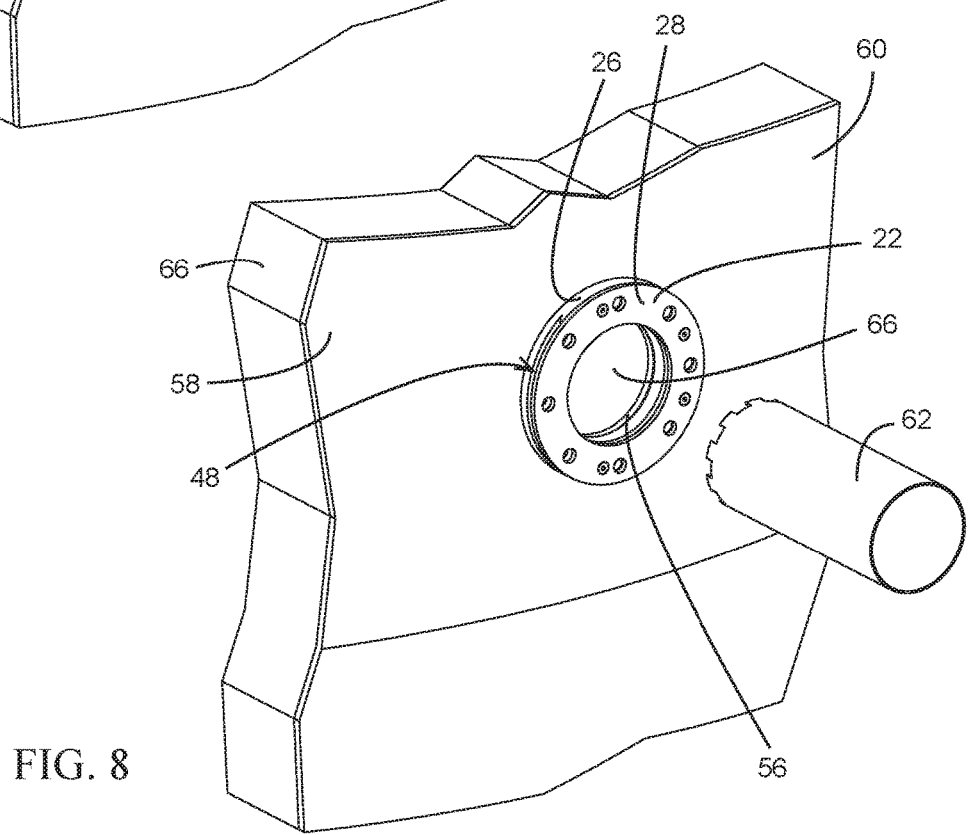
FIG. 8 depicts the mounting ring of the flange assembly welded to the outer wall of the bulk material processing/handling equipment and encircling a hole that has been cut through the outer wall.
Figure 9:
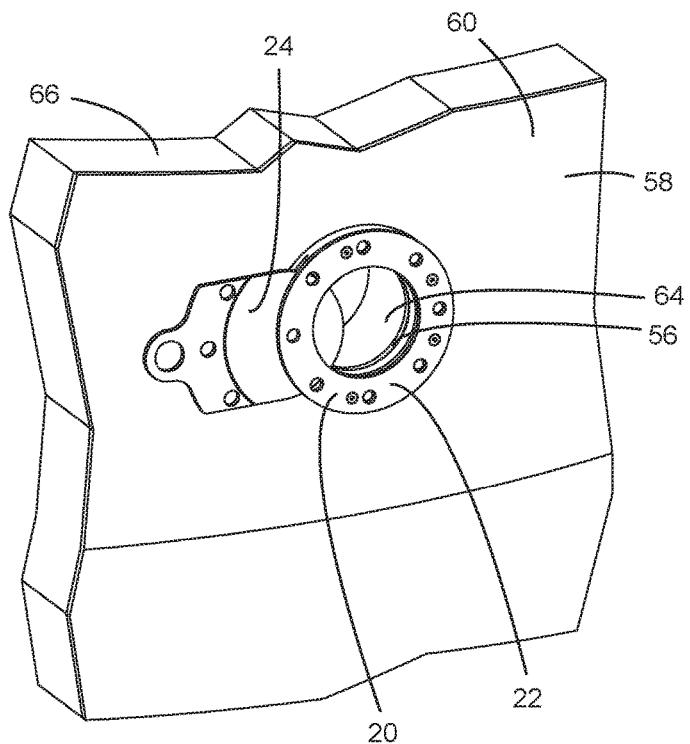
FIG. 9 depicts the insertion of the gate into the mounting ring after a hole has been formed through the inner wall of the bulk material processing/handling equipment.
Figure 10:
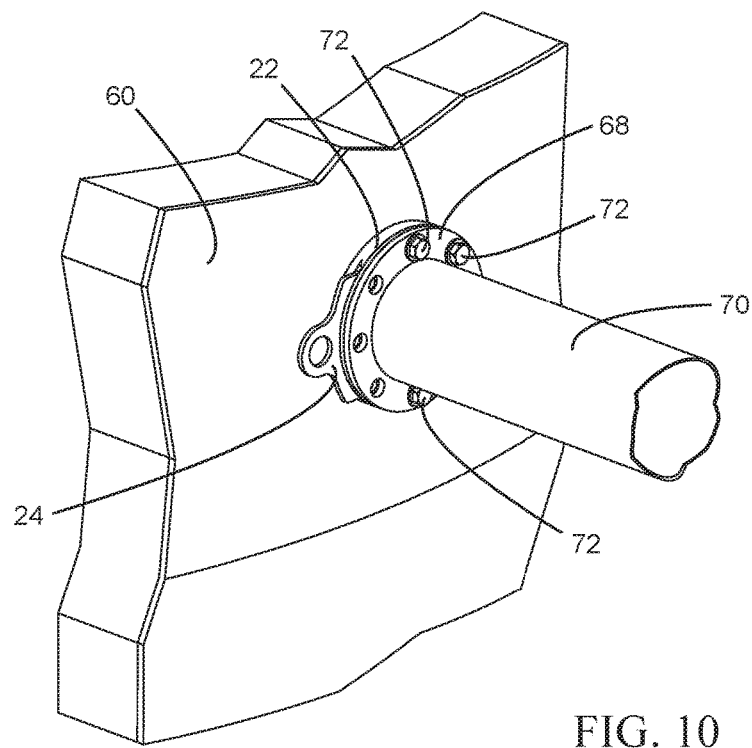
FIG. 10 depicts an air cannon pipe bolted to the flange assembly during the installation of the air cannon.
Figure 11:
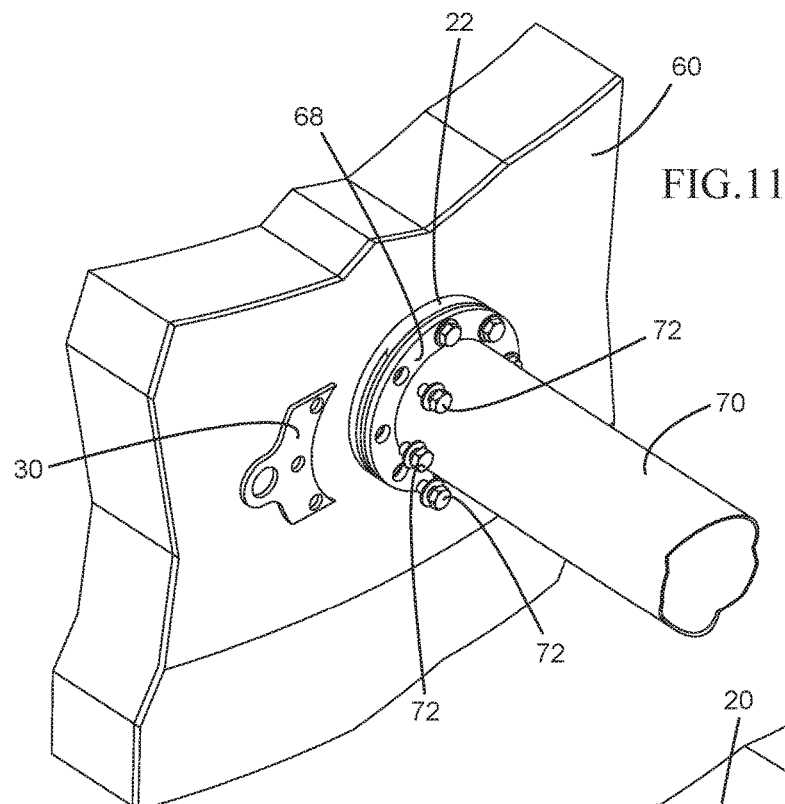
FIG. 11 depicts the insertion of the flange portion of the gate into the slot of the mounting ring after the blocking portion of the gate has been separated from the flange portion of the gate.
Figure 12:
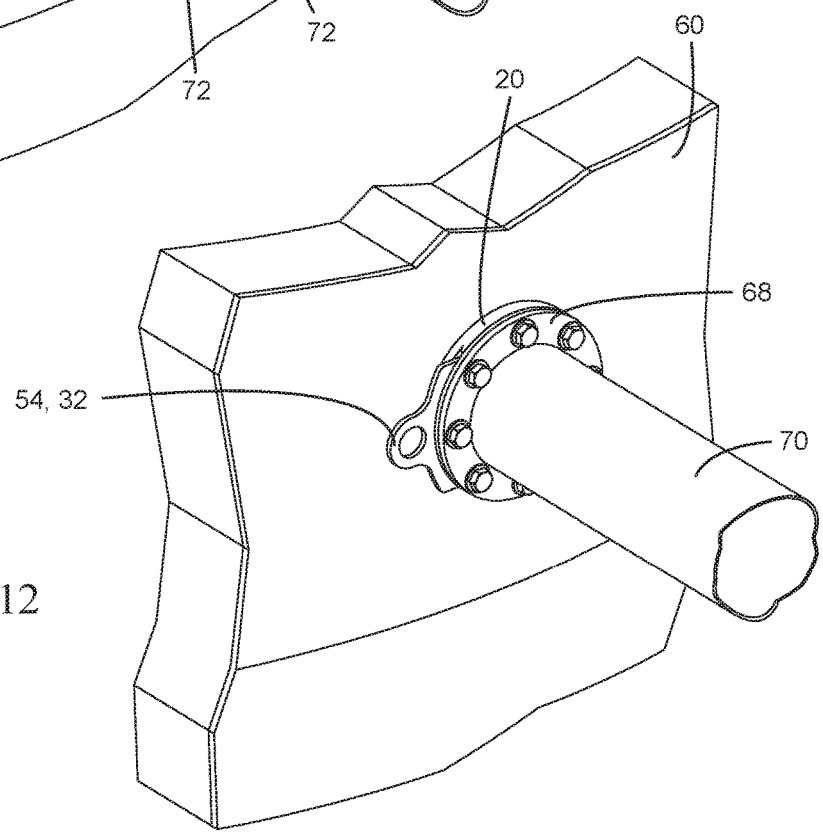
FIG. 12 depicts the air cannon pipe fully assembled to the bulk material processing/handling equipment via the flange assembly.

Following the step above, a drill, bore, or other device (62) is aligned with and guided through the fluid passageway (34) of the mounting ring (22) to form a hole (64) through the inner/refractory wall (66) of the bulk material processing/handling equipment (60), assuming the bulk material processing/handling equipment has an inner wall. This is depicted in FIG. 8. After forming the hole (64) through the inner wall (66), the gate (24) of the flange assembly (20) is then partially inserted into the slot (48) of the mounting ring (22) with the blocking portion (30) of the gate leading the flange portion (32) of the gate. When fully seated in the slot (48) the blocking portion (30) of the gate (24) prevents the flow of material/gas through the fluid passageway (34) of the mounting ring (22) into or out of the holes (56, 64) formed in the bulk material processing/handling equipment (60). As such, technicians are then able to attach an air cannon to the bulk material processing/handling equipment (60) without exposure to the inside of the processing/handling equipment. This is done by attaching the flange (68) of a connecting pipe (68) to the mounting ring (22) by inserting a plurality of bolts (72) through the non-threaded bolt holes (42) of the secondary portion (28) of the mounting ring and threading said bolts into the threaded bolt holes (36) of the primary portion (26) of the mounting ring. One or more of the bolt holes (36, 42) remain(s) unoccupied to allow the gate (24) to be removed from the slot (48) of the mounting ring (22).

After attaching the connecting pipe (70) to the mounting ring (22), the gate (24) is pulled out of the slot (48) of the mounting ring (22) via the handle (54) of the flange portion (32). The flange portion (32) of the gate (24) is then separated from the blocking portion (30) of the gate by bending the bridges (50) of the gate until they fracture. The flange portion (32) of the gate (24) is then partially inserted back into the slot (48) of the mounting ring (22) such that each non-threaded bolt hole (52) of the flange portion is aligned with a corresponding threaded bolt hole (36) of the primary portion (26) of the mounting ring (22) and a corresponding non-threaded bolt hole (42) of the secondary portion (28) of the mounting ring. Additional bolts (72) are then passed through the flange (68) of the connecting pipe (70) and said holes, thereby further securing the connecting pipe to the mounting ring (22), securing the flange portion (32) of the gate (24) to the mounting ring, and completing the assembly of the connecting pipe to the bulk material processing/handling equipment (60).

In view of the foregoing, it should be appreciated that the invention has several advantages over the prior art. Flange doesn't have to be securable to mounting ring prior to frangibly disconnecting the blocking portion.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such an order is inherent.

What is claimed is:

1. A flange assembly for mounting air cannons to bulk material processing equipment comprising:
   an annular mounting ring consisting of at least one component, the mounting ring being configured and adapted to be welded to bulk material processing equipment and connected to an air cannon in a manner connecting the air cannon to the bulk material processing equipment, the mounting ring comprising a plurality of circumferentially spaced threaded bolt holes and a slot, the mounting ring encircling a fluid passageway configured to allow fluid to pass through the mounting ring; and
   a gate comprising a temporary blocking portion frangibly connected to a flange portion, the gate being at least partially insertable through the slot of the mounting ring in a manner such that the blocking portion is able to at least partially prevent fluid from flowing through the fluid passageway of the mounting ring, the flange portion being configured to be securely attached to the annular mounting ring via at least one bolt threaded at least partially into one of the threaded bolt holes of the mounting ring after the blocking portion of the gate has been frangibly disconnected from the flange portion; and
   the flange assembly being configured such that fluid is able to pass through the fluid passageway of the mounting ring after the blocking portion of the gate has been frangibly disconnected from the flange portion and the flange portion has been secured to the annular mounting ring.

2. The flange assembly in accordance with claim 1 wherein the mounting ring comprises a first piece and a second piece, the first piece is annular and configured and adapted to be welded to bulk material processing equipment, and the first and second pieces are secured to each other and collectively define the slot.

3. The flange assembly in accordance with claim 2 wherein the second piece of the mounting ring is annular and encircles the fluid passageway.

4. The flange assembly in accordance with claim 2 wherein the first piece of the mounting ring comprises the threaded bolt holes and the second piece of the mounting ring comprises at least two unthreaded bolt holes that are each aligned with a respective one of the threaded bolt holes of the first piece of the mounting ring.

5. The flange assembly in accordance with claim 2 wherein the first and second pieces of the mounting ring are secured to each other via bolts that are not within the threaded bolt holes of the mounting ring.

6. The flange assembly in accordance with claim 1 wherein the slot of the mounting ring and the blocking portion of the gate are configured such that the blocking portion and the slot extend across the fluid passageway of the mounting ring and into opposite sides of the mounting ring when the blocking portion of the gate is connected to the flange portion of the gate and the blocking portion of the gate is fully inserted into the slot.

7. The flange assembly in accordance with claim 1 wherein the flange portion of the gate comprises a handle that is configured and adapted to facilitate the insertion and removal of the blocking portion of the gate into and out of the slot of the mounting ring.

8. A method of attaching an air cannon to bulk material processing equipment of the type having a metal outer wall adjacent a refractory interior wall, the method comprising:
   cutting a hole through the metal outer wall of the equipment; then
   welding a mounting ring to the outer wall, mounting ring consisting of at least one component, the mounting ring comprising a plurality of circumferentially spaced threaded bolt holes and a slot, the mounting ring encircling a fluid passageway configured to allow fluid to pass through the mounting ring, the welding occurring in a manner such that the fluid passageway of the mounting ring is aligned with the hole cut through the outer wall of the equipment; then
   forming a hole through the inner wall of the equipment by passing a drill through the fluid passageway of the mounting ring and through the hole in the outer wall of the equipment; then
   inserting a gate at least partially into the slot of the mounting ring, the gate comprising a temporary blocking portion frangibly connected to a flange portion, the blocking portion of the gate at least partially preventing fluid from flowing through the fluid passageway of the mounting ring after inserting the gate at least partially into the slot of the mounting ring; then bolting a pipe to the mounting ring via at least one of the threaded bolt holes of the mounting ring; then removing the gate from the slot of the mounting ring; then breaking the frangible connection between the blocking portion of the gate and the flange portion of the gate; then inserting the flange portion of the gate at least partially into the slot of the mounting ring; and then securing the flange portion of the gate to the mounting ring via threading a bolt into at least one of the threaded bolt holes of the mounting ring.

9. The method in accordance with claim 8 wherein the securing of the flange portion of the gate to the mounting ring via threading the bolt further secures the pipe to the mounting ring.

10. The method in accordance with claim 8 wherein breaking the frangible connection between the blocking portion of the gate and the flange portion of the gate occurs by exerting a bending moment between the blocking portion and the flange.

\* \* \* \* \*